(12) United States Patent
Cheng

(10) Patent No.: US 9,019,860 B2
(45) Date of Patent: Apr. 28, 2015

(54) METHOD, TERMINAL AND COMMUNICATION SYSTEM FOR STARTING COMPRESSED MODE

(75) Inventor: Xiang Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 152 days.

(21) Appl. No.: 13/806,770

(22) PCT Filed: Apr. 13, 2011

(86) PCT No.: PCT/CN2011/072754
§ 371 (c)(1),
(2), (4) Date: Dec. 22, 2012

(87) PCT Pub. No.: WO2012/003730
PCT Pub. Date: Jan. 12, 2012

(65) Prior Publication Data
US 2013/0094393 A1    Apr. 18, 2013

(30) Foreign Application Priority Data

Jul. 6, 2010    (CN) .......................... 2010 1 0226280

(51) Int. Cl.
*H04W 4/00*     (2009.01)
*H04B 7/212*    (2006.01)
*H04W 24/00*    (2009.01)
*H04W 28/06*    (2009.01)
*H04W 24/10*    (2009.01)

(52) U.S. Cl.
CPC .............. *H04W 24/00* (2013.01); *H04W 24/10* (2013.01); *H04W 28/06* (2013.01)

(58) Field of Classification Search
USPC .......... 370/231–329, 331–334; 455/436–440
See application file for complete search history.

(56) References Cited

U.S. PATENT DOCUMENTS

| 7,542,766 | B2 * | 6/2009 | Kobayashi et al. ........... 455/440 |
| 7,649,869 | B2 * | 1/2010 | Mittal et al. .................. 370/332 |
| 7,986,661 | B2 * | 7/2011 | Bhattacharjee et al. ...... 370/329 |
| 8,005,482 | B2 * | 8/2011 | Tolli et al. .................... 455/453 |

(Continued)

FOREIGN PATENT DOCUMENTS

| CN | 101395939 A | 3/2009 |
| WO | WO 2004/025983 A1 | 3/2004 |

OTHER PUBLICATIONS

International Search Report corresponding to International Patent Application No. PCT/CN2011/072754 dated Jul. 7, 2011.

(Continued)

*Primary Examiner* — M. Phan
(74) *Attorney, Agent, or Firm* — Jenkins, Wilson, Taylor & Hunt, P.A.

(57) ABSTRACT

The present invention discloses a method, a terminal and a communication system for starting a compressed mode, wherein the method comprises: a terminal receiving information of a target cell to be measured from a radio network controller; according to the information of the target cell to be measured, the terminal determining a transmission gap pattern sequence; according to the determined transmission gap pattern sequence, the terminal starting a compressed mode to perform a measurement to the target cell. In accordance with the present invention, the problem that a compressed mode can not be started in the case of load balancing mechanism or service bearer feature mechanism is solved, and the Quality of Service (QoS) of the terminal as well as the performance of the system are enhanced.

18 Claims, 7 Drawing Sheets

(56) References Cited

U.S. PATENT DOCUMENTS

| | | | |
|---|---|---|---|
| 8,090,376 B2* | 1/2012 | Tolli et al. | 455/439 |
| 8,094,554 B2* | 1/2012 | Gholmieh et al. | 370/230 |
| 8,200,221 B2* | 6/2012 | Tolli et al. | 455/435.3 |
| 8,331,253 B2* | 12/2012 | Farnsworth et al. | 370/252 |
| 8,451,770 B2* | 5/2013 | Chen et al. | 370/321 |
| 2005/0277416 A1* | 12/2005 | Tolli et al. | 455/436 |
| 2007/0207824 A1 | 9/2007 | Bhattacharjee et al. | |
| 2012/0051258 A1* | 3/2012 | Josso | 370/252 |
| 2013/0121294 A1* | 5/2013 | Cheng | 370/329 |

OTHER PUBLICATIONS

Technical Specification Group Radio Access Network: "3GPP TS 25.215 V9.2.0: Physical layer; Measurements (FDD) (Release 9)" 3rd Generation Partnership Program (3GPP); Technical Specification (TS), vol. 25.215, No. 9.2.0. Mar. 2010. pp. 19-21, section 6.1.1.2.

Technical Specification Group Radio Access Network: "3GPP TS 25.331 V9.3.0: Radio Resource Control (RRC); Protocol specification (Release 9)" 3rd Generation Partnership Program (3GPP); Technical Specification (TS), vol. 25.311, No. 9.3.0. Jun. 2010. pp. 808-811, section 10.3.6.33.

* cited by examiner

METHOD, TERMINAL AND COMMUNICATION SYSTEM FOR STARTING COMPRESSED MODE

CROSS-REFERENCE TO RELATED APPLICATIONS

This application is filed under the provisions of 35 U.S.C. §371 and claims the priority of International Patent Application No. PCT/CN2011/072754 filed on Apr. 13, 2011, and of Chinese Patent Application No. 201010226280.X filed on Jul. 6, 2010. The disclosures of the foregoing international patent application and Chinese patent application are hereby incorporated by reference herein in their respective entireties.

FIELD OF THE INVENTION

The present invention relates to the field of radio communications, in particular to a method, a terminal and a communication system for starting a compressed mode.

BACKGROUND OF THE INVENTION

With the evolution of the radio network communication technology, from the second generation Global System for Mobile communication (GSM) to the third generation Wideband Code Division Multiple Access (WCDMA) system, then to the third Enhanced Universal Radio Access (E-UTRA) system, according to users' demands, multiple systems coexist in the network deployment of operators. At present, the radio network functions of the operators are usually provided like this: the second generation GSM system is mainly used for carrying the voice; the third generation WCDMA system is mainly used for carrying Packet Switched (PS) domain services, conversational services and video services; and the third generation E-UTRAN system is mainly used for carrying super-speed PS domain services.

Therefore, according to the current network deployment, the mobility between the second generation GSM system and the third generation ECDMA system is very important. Moreover, in the near future, the mobility management of the third generation E-UTRA system, for example, switching to the hot spot region of the E-UTRA system, will also become important.

The switching process caused by the above mobility management among the systems requires the measurement for the target system and the target carrier frequency in the prior switching preparatory stage so as to make an accurate switching decision.

A compressed mode plays an important role in the inter-carrier frequency measurement and inter-system measurement. When the compressed mode is adopted, the terminal can measure the non-serving carrier frequencies and the carrier frequencies of other systems without any need to be configured with dual receivers. When a terminal configured with only one receiver moves from the third generation WCDMA system to the area only covered with the second generation GSM system, it can only adopt the compressed mode to perform the inter-system measurement. Likewise, the compressed mode can also be used for the terminal which moves into or out of the area covered with the multi-carrier frequencies of the third generation WCDMA system. In the compressed mode, the terminal can perform measurement of another non-serving carrier frequency without losing any data transmitted on the serving carrier frequency.

The compressed mode is defined as a transmission mode through which the data transmission will be compressed in the time domain and a transmission gap will be generated. The receiver of the terminal can tune to another carrier frequency to perform measurement by using this transmission gap.

The transmission gap is generally described and determined by a transmission gap pattern sequence. Each set of the transmission gap pattern sequence is uniquely identified by one transmission gap pattern sequence identification. Each set of the transmission gap pattern sequence can only be used for one kind of transmission gap pattern sequence measurement purpose, namely one of the measurement purposes of Frequency-Division Duplex measurement, Time-Division Duplex measurement, GSM Carrier Received Signal Strength Indication (RSSI) measurement, GSM Initial Base Station Identity Code Identification, GSM Base Station Identity Code Identification Reconfirmation, multi-carrier frequency measurement, E-UTRA measurement and so on.

As shown in FIG. 1, each set of transmission gap pattern sequence comprises two kinds of alternate transmission gap patterns, i.e. Transmission Gap Pattern 1 and Transmission Gap Pattern 2. Each kind of transmission gap pattern provides one or two transmission gaps within one transmission gap pattern length. In addition, each set of transmission gap pattern sequence also comprises a transmission gap Connection Frame Number (CFN) indicating the start/stop time of the compressed mode, and repetition times of the transmission gap pattern, etc. These parameters are all determined according to the transmission gap pattern sequence measurement purpose.

In consideration of accelerating switching process and enhancing switching reliability, especially in the area where the radio signal quality is deteriorating rapidly, it is needed to accomplish the inter-carrier frequency measurement and the inter-system measurement quickly. In this way, it means that: the later the compressed mode is started, the better it is; and the shorter the duration time of the compressed mode is, the better it is, so as to enhance the system capacity and the user throughput. Thus, it is considered to control the compressed mode between a terminal and a NodeB by the terminal. A terminal judges that the radio signal quality of a current serving cell is not good, it might be needed to perform an inter-carrier frequency measurement and an inter-system measurement to prepare for the switching to an inter-carrier frequency/inter-system adjacent cell, then the terminal starts the compressed mode and notifies the NodeB.

However, when the terminal adopts the control method above, the following conditions can not be processed.

1) When a large number of terminals appear in one cell, the available resources of the cell might not be sufficient to guarantee the Quality of Service (QoS) of all services of all terminals, thus congestion or overload is caused. A low-cost method to cope with a congested or overloaded cell is to balance the services to an adjacent cell with lower load, and this is called a load balancing mechanism. The load balancing mechanism, by way of switching a terminal from a congested or overloaded cell to an adjacent cell with lower load, achieves the purpose of balancing services to an adjacent cell with lower load.

2) Since the operator would have a service deployment tendency for different systems or different frequency points in the condition of deploying a network with multiple radio systems, for example, the second generation GSM system processes voice services, and the third generation WCDMA system processes packet domain services. Then, after a terminal accesses the radio system (access cell) from an unexpected system or frequency layer, since the services, in accordance with the bearer feature, are not placed in the expected system or frequency layer, then it is needed to place these services in a proper radio system (adjacent cell of the access cell) to bear and run in accordance with the bearer feature, and this is called a service bearer feature mechanism. Through the service bearer feature mechanism, different services can be placed in a radio system with the proper bearer feature to bear and run, for example, voice services are placed in the second generation GSM system (adjacent cell of the access cell) to bear and run, and packet domain services are placed in the third generation WCDMA system (adjacent cell of the access cell) to bear and run.

When performing the load balancing mechanism and the service bearer feature mechanism mentioned above, it is needed to start the compressed mode to perform the inter-carrier frequency measurement and the inter-system measurement of these adjacent cells (that is, target cells to be measured), so as to prepare for the switching to an inter-carrier frequency/inter-system adjacent cell. However, at this moment, the radio signal quality measured by the terminal in the current serving cell generally is good. After all, the nature of the load balancing mechanism or the service bearer feature mechanism is that the current serving cell is congested or overloaded, just the load of the current serving cell is too high and needs to be balanced to other cells for sharing load, or to optimize and adjust the service bearer; thus the radio signal received by the terminal has no problem and the quality is good.

For this load balancing mechanism and the service bearer feature mechanism, it is also required to start the compressed mode as late as possible and keep the lasting time of the compressed mode as short as possible, so as to reduce the load of the current serving cell quickly, prevent the current serving cell from collapse and avoid influencing all services of all terminals in the current serving cell, quickly match a proper bearer object for a service and avoid low QoS and poor service experience.

However, in the conditions that the load balancing mechanism or the service bearer feature mechanism appears, the terminal can not learn the load/bearer condition of the current serving cell and the adjacent cell (the adjacent cell is the target cell to be measured) and has no idea of the optimization and adjustment policy of the service bearer, can not learn the service bearer tendency of the current access cell and the adjacent cell of the access cell (the adjacent cell is the target cell to be measured), thus the terminal can not control the start of the compressed mode, and the QoS and the system performance of the terminal are impacted.

SUMMARY OF THE INVENTION

The present invention provides a method, a terminal and a system for starting a compressed mode, so as to solve the problem that a compressed mode can not be started in the case of load balancing mechanism or service bearer feature mechanism.

According to one aspect of the present invention, a method for starting a compressed mode is provided, comprising: a terminal receiving information of a target cell to be measured from a radio network controller; the terminal determining a transmission gap pattern sequence according to the information of the target cell to be measured; and the terminal starting, according to the determined transmission gap pattern sequence, a compressed mode to perform a measurement to the target cell.

Preferably, before the step of the terminal receiving information of the target cell to be measured from the radio network controller, the method further comprises: the terminal storing transmission gap pattern sequence information, wherein the transmission gap pattern sequence information comprises: measurement purpose information, transmission gap pattern sequence identification information corresponding to the measurement purpose, and transmission gap information corresponding to the measurement purpose; and the step of the terminal determining the transmission gap pattern sequence according to the information of the target cell to be measured comprises: the terminal determining the transmission gap pattern sequence according to the information of the target cell to be measured and the transmission gap pattern sequence information.

Preferably, the terminal stores the transmission gap pattern sequence information by one of the following ways: the terminal, a NodeB and the radio network controller appointing the transmission gap pattern sequence information in advance, and the terminal storing the appointed transmission gap pattern sequence information; the radio network controller configuring the transmission gap pattern sequence information for the terminal and a NodeB, and the terminal storing the configured transmission gap pattern sequence information.

Preferably, the information of the target cell to be measured comprises: a cell identification, a type indication of a mode adopted by a cell and a cell frequency, wherein the mode adopted by the cell comprises: a Frequency Division Duplex (FDD) mode, a Time Division Duplex (TDD) mode, a Global system for Mobile Communication (GSM) mode or an Enhanced Universal Terrestrial Radio Access (E-UTRA) mode; the step of the terminal determining the transmission gap pattern sequence comprises: when the target cell adopts the FDD mode, the terminal selecting the transmission gap pattern sequence with measurement purpose of FDD measurement; when the target cell adopts the TDD mode, the terminal selecting the transmission gap pattern sequence with measurement purpose of TDD measurement; when the target cell adopts the GSM mode, the terminal selecting the transmission gap pattern sequences corresponding to the following three measurement purposes: GSM Carrier Received Signal Strength Indication measurement, GSM Initial Base Station Identity Code Identification and GSM Base Station Identity Code Identification Reconfirmation; when the target cell adopts the E-UTRA mode, the terminal selecting the transmission gap pattern sequence with measurement purpose of E-UTRA measurement.

Preferably, the target cell to be measured comprises at least one of the following: in a load balancing mechanism, an inter-carrier frequency and/or inter-system adjacent cell, selected by the radio network controller for sharing load, of a current serving cell; in a service bearer feature mechanism, an inter-carrier frequency and/or inter-system adjacent cell, selected by the radio network controller for bearing a service of the terminal, of an access cell.

Preferably, the step of the terminal starting the compressed mode according to the determined transmission gap pattern sequence comprises: the terminal notifying the determined transmission gap pattern sequence to a NodeB; and the terminal and the NodeB generating, according to the transmission gap pattern sequence, a transmission gap used for measuring the target cell.

Preferably, before the step of the terminal receiving the information of the target cell to be measured from the radio network controller, the method further comprises: the radio network controller sending the information of the target cell to be measured to the terminal through a Radio Resource Control (RRC) protocol layer control signaling; and the step of the terminal notifying the determined transmission gap pattern sequence to the NodeB comprises: the terminal notifying the determined transmission gap pattern sequence to the NodeB through a High Speed Dedicated Physical Control Channel (HS-DPCCH).

Preferably, after the step of the terminal receiving the information of the target cell to be measured from the radio network controller, the method further comprises: the terminal stopping a currently started transmission gap pattern sequence and notifying a NodeB to stop the currently started transmission gap pattern sequence.

According to another aspect of the present invention, a terminal is provided, comprising: a receiving module, configured to receive information of a target cell to be measured from a radio network controller; a sequence determination module, configured to determine a transmission gap pattern sequence according to the information of the target cell to be measured; a start module, configured to start a compressed mode according to the determined transmission gap pattern sequence to perform a measurement to the target cell.

Preferably, the terminal further comprises: an information storage module, configured to store transmission gap pattern sequence information, wherein the transmission gap pattern sequence information comprises: measurement purpose information, transmission gap pattern sequence identification information corresponding to the measurement purpose, and transmission gap information corresponding to the measurement purpose; the sequence determination module comprises: a sequence determination unit, configured to determine the transmission gap pattern sequence according to the information of the target cell to be measured and the transmission gap pattern sequence information.

Preferably, the information of the target cell to be measured received by the receiving module comprises: a cell identification, a type indication of a mode adopted by a cell and a cell frequency, wherein the mode adopted by the cell comprises: an FDD mode, a TDD mode, a GSM mode or an E-UTRA mode; the sequence determination unit comprises: a first sequence determination unit, configured to select the transmission gap pattern sequence with measurement purpose of FDD measurement when the target cell adopts the FDD mode; a second sequence determination unit, configured to select the transmission gap pattern sequence with measurement purpose of TDD measurement when the target cell adopts the TDD mode; a third sequence determination unit, configured to select, when the target cell adopts the GSM mode, the transmission gap pattern sequences corresponding to the following three measurement purposes: GSM Carrier Received Signal Strength Indication measurement, GSM Initial Base Station Identity Code Identification and GSM Base Station Identity Code Identification Reconfirmation; a fourth sequence determination unit, configured to select the transmission gap pattern sequence with measurement purpose of E-UTRA measurement when the target cell adopts the E-UTRA mode.

Preferably, the start module comprises: a notification unit, configured to notify the determined transmission gap pattern sequence to a NodeB; a start unit, configured to generate, according to the transmission gap pattern sequence, a transmission gap used for measuring the target cell.

According to still another aspect of the present invention, a communication system is provided, comprising a radio network controller, a NodeB and a terminal, wherein the radio network controller is configured to send information of a target cell to be measured to the terminal; the terminal comprises: a receiving module, configured to receive the information of the target cell to be measured from the radio network controller; a sequence determination module, configured to determine a transmission gap pattern sequence according to the information of the target cell to be measured; a start module, configured to start a compressed mode according to the determined transmission gap pattern sequence to perform a measurement to the target cell.

Preferably, the terminal further comprises: an information storage module, configured to store transmission gap pattern sequence information, wherein the transmission gap pattern sequence information comprises: measurement purpose information, transmission gap pattern sequence identification information corresponding to the measurement purpose, and transmission gap information corresponding to the measurement purpose; the sequence determination module comprises: a sequence determination unit, configured to determine the transmission gap pattern sequence according to the information of the target cell to be measured and the transmission gap pattern sequence information.

Preferably, the terminal, the NodeB and the radio network controller are further configured to appoint the transmission gap pattern sequence information in advance, and the information storage module is configured to store the appointed transmission gap pattern sequence information; or, the radio network controller is further configured to configure the transmission gap pattern sequence information for the terminal and the NodeB in advance, and the information storage module is configured to store the configured transmission gap pattern sequence information.

In accordance with the present invention, a transmission gap pattern sequence is determined according to the information of the target cell to be measured, and a compressed mode is started according to the determined transmission gap pattern sequence, the problem that a compressed mode can not be started in the case of load balancing mechanism or service bearer feature mechanism is solved, and the QoS of the terminal as well as the performance of the system are enhanced.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described below in detail by reference to the accompanying drawings in conjunction with embodiments. It should be noted that the embodiments and the characteristics of the embodiments can be combined with each other if no conflict is caused.

The communication system in the embodiments of the present invention comprises a radio network controller, a NodeB and a terminal, wherein the devices are in a wireless connection with each other and follow related radio communication standards. The following embodiments are all illustrated by taking the implementation on this communication system for example.

Embodiment 1

Figure 1:
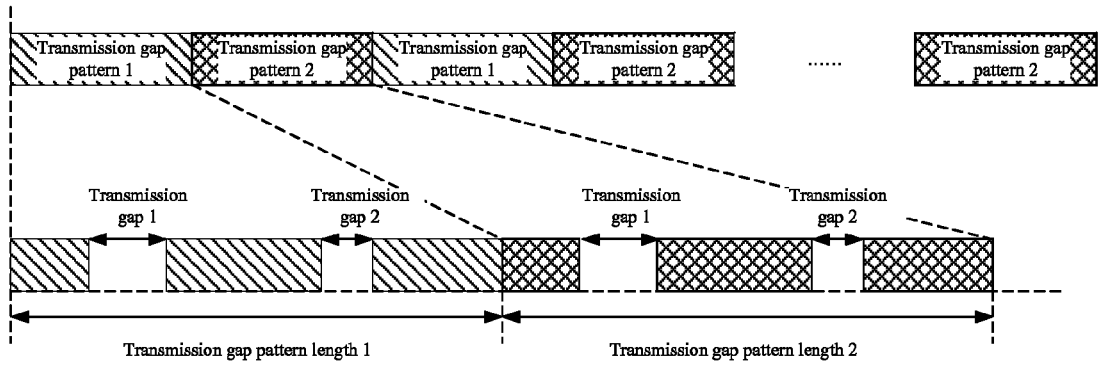
FIG. 1 shows a schematic diagram of a transmission gap pattern sequence according to relevant technology.
Figure 2:
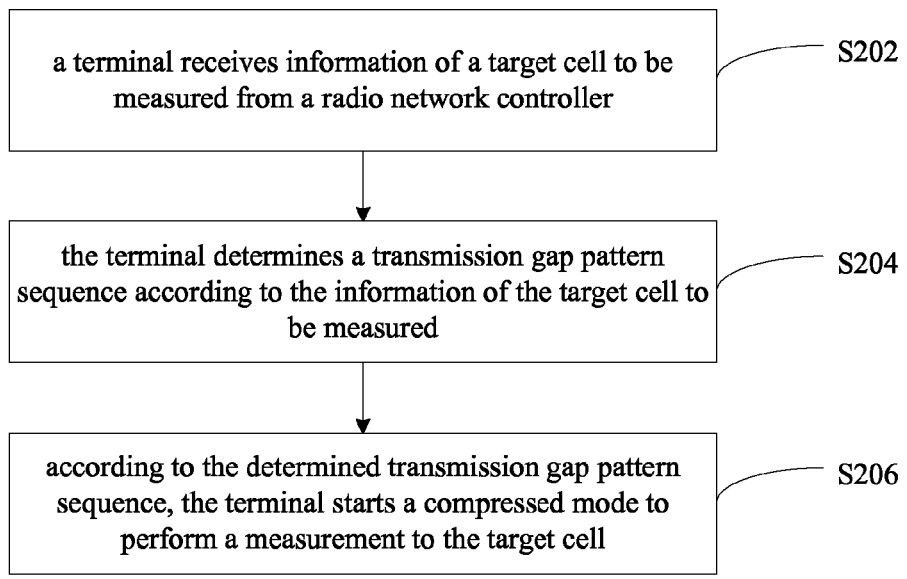
FIG. 2 shows a flowchart of a method for starting a compressed mode according to Embodiment 1 of the present invention.

FIG. 2 shows a flowchart of a method for starting a compressed mode according to the embodiment of the present invention. The method comprises the steps as follows.

Step S202: a terminal receives information of a target cell to be measured from a radio network controller.

In this embodiment, the target cell to be measured provided by the radio network controller can be one or more cells, for example, the target cell can be: in a load balancing mechanism, an inter-carrier frequency and/or inter-system adjacent cell, selected by the radio network controller for sharing load, of a current serving cell; the target cell also can be: in a service bearer feature mechanism, an inter-carrier frequency and/or inter-system adjacent cell, selected by the radio network controller for bearing a service of the terminal, of an access cell.

Step S204: the terminal determines a transmission gap pattern sequence according to the information of the target cell to be measured.

Preferably, before S202, the method further comprises the steps that: the terminal stores transmission gap pattern sequence information, wherein the transmission gap pattern sequence information comprises: measurement purpose information, transmission gap pattern sequence identification information corresponding to the measurement purpose, and transmission gap information corresponding to the measurement purpose. For example, the transmission gap pattern sequence information for starting the compressed mode specifically comprises: one set of multiple sets of transmission gap pattern sequences. The information of each set of transmission gap pattern sequence at least comprises: transmission gap pattern sequence identification information, transmission gap pattern sequence measurement purpose information, transmission gap pattern 1 and/or transmission gap pattern 2 information, and the information of the transmission gap provided by each type of transmission gap pattern in one transmission gap pattern length.

The terminal can determine the transmission gap pattern sequence according to the information of the target cell to be measured and the transmission gap pattern sequence information.

The terminal can store the transmission gap pattern sequence information by one of the following ways: 1) the terminal, a NodeB and the radio network controller appoint the transmission gap pattern sequence information in advance, and the terminal stores the appointed transmission gap pattern sequence information; 2) the radio network controller configures the transmission gap pattern sequence information for the terminal and a NodeB, and the terminal stores the configured transmission gap pattern sequence information. For example, when the system applies the second way, the radio network controller can configure the transmission gap pattern sequence information used for starting a compressed mode for the terminal through an RRC protocol layer control signaling; meanwhile, the radio network controller configures the transmission gap pattern sequence information used for starting a compressed mode for the NodeB through a NodeB Application Part (NBAP) protocol layer control signaling.

In the above, the RRC protocol layer is used to provide the control signaling between the radio network controller and the terminal; the NBAP protocol layer is used to provide the control signaling between the radio network controller and the NodeB.

Step S206: according to the determined transmission gap pattern sequence, the terminal starts a compressed mode to perform a measurement to the target cell.

The step that the terminal starts a compressed mode comprises the step that: the terminal notifies the determined transmission gap pattern sequence to the NodeB; according to the transmission gap pattern sequence, the terminal and the NodeB generate a transmission gap used for measuring the target cell.

In the transmission gap, the terminal performs a measurement to the target cell to be measured on a frequency of the target cell to be measured. Herein, the frequency refers to the transmitting frequency of a radio signal, that is, the frequency of an uplink radio signal transmitted to the NodeB by the terminal in a certain cell and the frequency of a downlink radio signal transmitted to the terminal by the NodeB in a certain cell. For example, the working frequency range of GSM900 is 890 to 960 MHz, and the working frequency range of GSM1800 is 1710 to 1880 MHz.

In the embodiment of the present invention, the information of the target cell to be measured comprises: a cell identification, a type indication of a mode adopted by a cell and a cell frequency, wherein the mode adopted by the cell comprises: an FDD mode, a TDD mode, a GSM mode or an E-UTRA mode. The terminal determines the transmission gap pattern sequence according to the mode adopted by the target cell.

In the embodiment of the present invention, the transmission gap pattern sequence identification mentioned above is encoded by 3 bits, with a value range of 0 to 7. The transmission gap pattern sequence identification with the value of 0 is appointed to be reserved, indicating all currently started transmission gap pattern sequences and being used only when the terminal stops the transmission gap pattern sequence. The rest 7 values from 1 to 7 are used for the transmission gap pattern sequence identification, and each set of transmission gap pattern sequence is uniquely identified by one transmission gap pattern sequence identification. The action of "starting" or "stopping" the transmission gap pattern sequence is encoded by one bit to indicate; when the bit takes a value of 1, it is indicated to "start", when the bit takes a value of 0, it is indicated to "stop".

The embodiment of the present invention notifies the determined transmission gap pattern sequence to the NodeB by adopting an HS-DPCCH, wherein the HS-DPCCH is an uplink direction control channel, which is used to bear the feedback information of downlink data reception Acknowledgement/Non-Acknowledgement for the downlink data reception conditions, and to bear the quality feedback information of the downlink data reception quality. In the HS-DPCCH, a domain for bearing the Acknowledgement/Non- Acknowledgement information for the downlink data reception conditions is called a Confirmation domain.

The Confirmation domain mentioned above consists of 10 bits. The present embodiment uses the unused encoded part in the 10-bit Confirmation domain in the HS-DPCCH. When the first bit of the Confirmation domain is 1 and the second bit is 0, the rest 8 bits with code valued from all 0 to all 1 are not utilized by relevant technology. In each of the following embodiments involved in the HS-DPCCH, when the first bit of the Confirmation domain is 1 and the second bit is 0, the third/fourth/fifth bit of the Confirmation domain is used to indicate the transmission gap pattern sequence identification, wherein the transmission gap pattern sequence identification with the value of 0 is appointed to be reserved, indicating all currently started transmission gap pattern sequences and being used only when the terminal or the NodeB stops the transmission gap pattern sequence. The rest 7 values from 1 to 7 are used for the transmission gap pattern sequence identification, and each set of transmission gap pattern sequence is uniquely identified by one transmission gap pattern sequence identification. The sixth bit of the Confirmation domain is used to indicate the action of "starting" or "stopping" the transmission gap pattern sequence. For example, when the bit takes a value of 1, it is indicated to "start", when the bit takes a value of 0, it is indicated to "stop".

In the embodiment, the terminal receives information of the target cell to be measured from a radio network controller, determines a proper transmission gap pattern sequence according to the information of the target cell to be measured and then starts a compressed mode, thereby solving the problem that a compressed mode can not be started in the case of load balancing mechanism or service bearer feature mechanism, enhancing the QoS of the terminal as well as the performance of the system.

Embodiment 2

Figure 3:
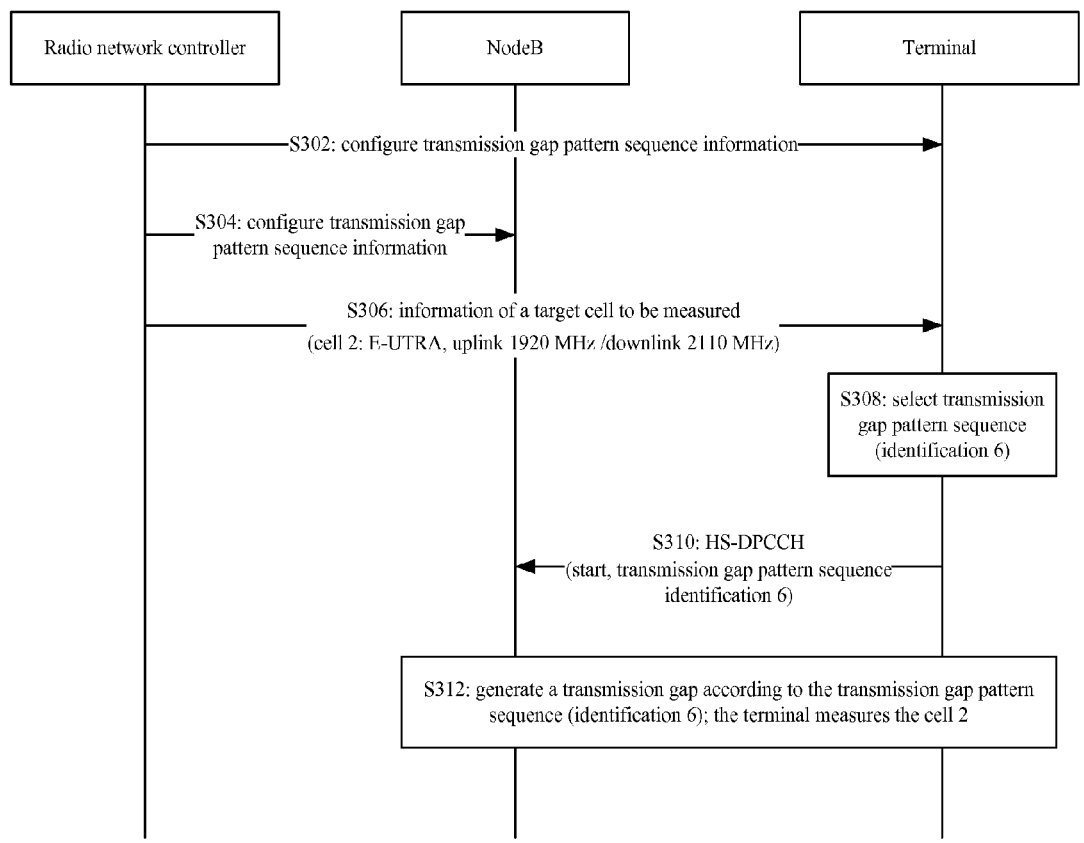
FIG. 3 shows a flowchart of a method for starting a compressed mode according to Embodiment 2 of the present invention.

The embodiment provides a method for starting a compressed mode, wherein the method is illustrated by taking the implementation in a high speed downlink packet access system for example. The implementation scene of the method is: a terminal accesses an access cell 1 of the WCDMA FDD mode and uses a service therein. Due to the service bearer feature mechanism, a radio network controller selects an inter-system adjacent cell (cell 2) of the access cell in the radio system, the cell 2 being more suitable to bear the service of the terminal. The cell 2 is an E-UTRA mode cell, with uplink frequency of 1920 MHz and downlink frequency of 2110 MHz. The terminal has no started transmission gap pattern sequence currently. Refer to FIG. 3, the method for starting a compressed mode comprises the steps as follows.

Step S302: the radio network controller configures the transmission gap pattern sequence information used for starting a compressed mode for the terminal through an RRC protocol layer control signaling.

In this embodiment, the transmission gap pattern sequence information used for starting a compressed mode specifically comprises contents as follows.

A first set of transmission gap pattern sequence, which is used for the measurement purpose of FDD measurement, wherein the transmission gap pattern sequence identification is 1. This set of transmission gap pattern sequence comprises two alternate patterns, that is, transmission gap pattern 1 and transmission gap pattern 2. Each transmission gap pattern provides one transmission gap in one transmission gap pattern length.

A second set of transmission gap pattern sequence, which is used for the measurement purpose of TDD measurement, wherein the transmission gap pattern sequence identification is 2. This set of transmission gap pattern sequence comprises one alternate pattern, that is, transmission gap pattern 1. The transmission gap pattern 1 provides two transmission gaps in one transmission gap pattern length.

A third set of transmission gap pattern sequence, which is used for the measurement purpose of GSM Carrier Received Signal Strength Indication measurement, wherein the transmission gap pattern sequence identification is 3. This set of transmission gap pattern sequence comprises two alternate patterns, that is, transmission gap pattern 1 and transmission gap pattern 2. Each transmission gap pattern provides two transmission gaps in one transmission gap pattern length.

A fourth set of transmission gap pattern sequence, which is used for the measurement purpose of GSM Initial Base Station Identity Code Identification, wherein the transmission gap pattern sequence identification is 4. This set of transmission gap pattern sequence comprises two alternate patterns, that is, transmission gap pattern 1 and transmission gap pattern 2. Each transmission gap pattern provides two transmission gaps in one transmission gap pattern length.

A fifth set of transmission gap pattern sequence, which is used for the measurement purpose of GSM Base Station Identity Code Identification Reconfirmation, wherein the transmission gap pattern sequence identification is 5. This set of transmission gap pattern sequence comprises two alternate patterns, that is, transmission gap pattern 1 and transmission gap pattern 2. Each transmission gap pattern provides two transmission gaps in one transmission gap pattern length.

A sixth set of transmission gap pattern sequence, which is used for the measurement purpose of E-UTRA measurement, wherein the transmission gap pattern sequence identification is 6. This set of transmission gap pattern sequence comprises one alternate pattern, that is, transmission gap pattern 1. The transmission gap pattern 1 provides two transmission gaps in one transmission gap pattern length.

Step S304: the radio network controller configures the transmission gap pattern sequence information used for starting a compressed mode for the NodeB through an NBAP protocol layer control signaling, wherein the transmission gap pattern sequence information used for starting a compressed mode is consistent with that in S302, and no enumeration is needed here.

Step S306: the radio network controller notifies the information of the target cell to be measured to the terminal through an RRC protocol layer control signaling. In this embodiment, there is only one target cell to be measured, the target cell is identified as cell 2 and is an E-UTRA mode cell, with uplink frequency of 1920 MHz and downlink frequency of 2110 MHz.

Step S308: the terminal receives the information and selects a proper transmission gap pattern sequence according to the information of the target cell to be measured. Specifically, since the target cell 2 to be measured belongs to the E-UTRA mode, the terminal selects the sixth set of transmission gap pattern sequence with the transmission gap pattern sequence measurement purpose of E-UTRA measurement, wherein the transmission gap pattern sequence identification is 6.

Step S310: the terminal starts the transmission gap pattern sequence with the transmission gap pattern sequence identification of 6 and notifies to the NodeB.

The terminal sends the information of starting the transmission gap pattern sequence with the transmission gap pattern sequence identification of 6 to the NodeB through an HS-DPCCH. The first bit of the Confirmation domain of the HS-DPCCH is 1 and the second bit is 0, the third/fourth/fifth bit of the Confirmation domain of the HS-DPCCH takes a value of 6 to indicate the transmission gap pattern sequence identification 6; the sixth bit of the Confirmation domain of the HS-DPCCH takes a value of 1 to indicate the action of "starting" the transmission gap pattern sequence.

Step S312: the terminal and the NodeB generate a transmission gap according to the description of the transmission gap pattern sequence with the transmission gap pattern sequence identification of 6. In the transmission gap, the terminal performs a measurement to the cell 2 on a frequency with uplink frequency of 1920 MHz/downlink frequency of 2110 MHz.

After the terminal completes the measurement, the started transmission gap pattern sequence would stop automatically; or, after the terminal performs cell switching, the started transmission gap pattern sequence would stop automatically.

In this embodiment, the terminal receives the information of the target cell 2 to be measured from the radio network controller, determines the sixth set of transmission gap pattern sequence according to the information of the target cell 2 to be measured and then starts the sixth set of transmission gap pattern sequence to perform a measurement to the cell 2. Thus, the problem that a compressed mode can not be started in the case of load balancing mechanism or service bearer feature mechanism is solved, and the QoS of the terminal as well as the performance of the system are enhanced.

Embodiment 3

Figure 4:
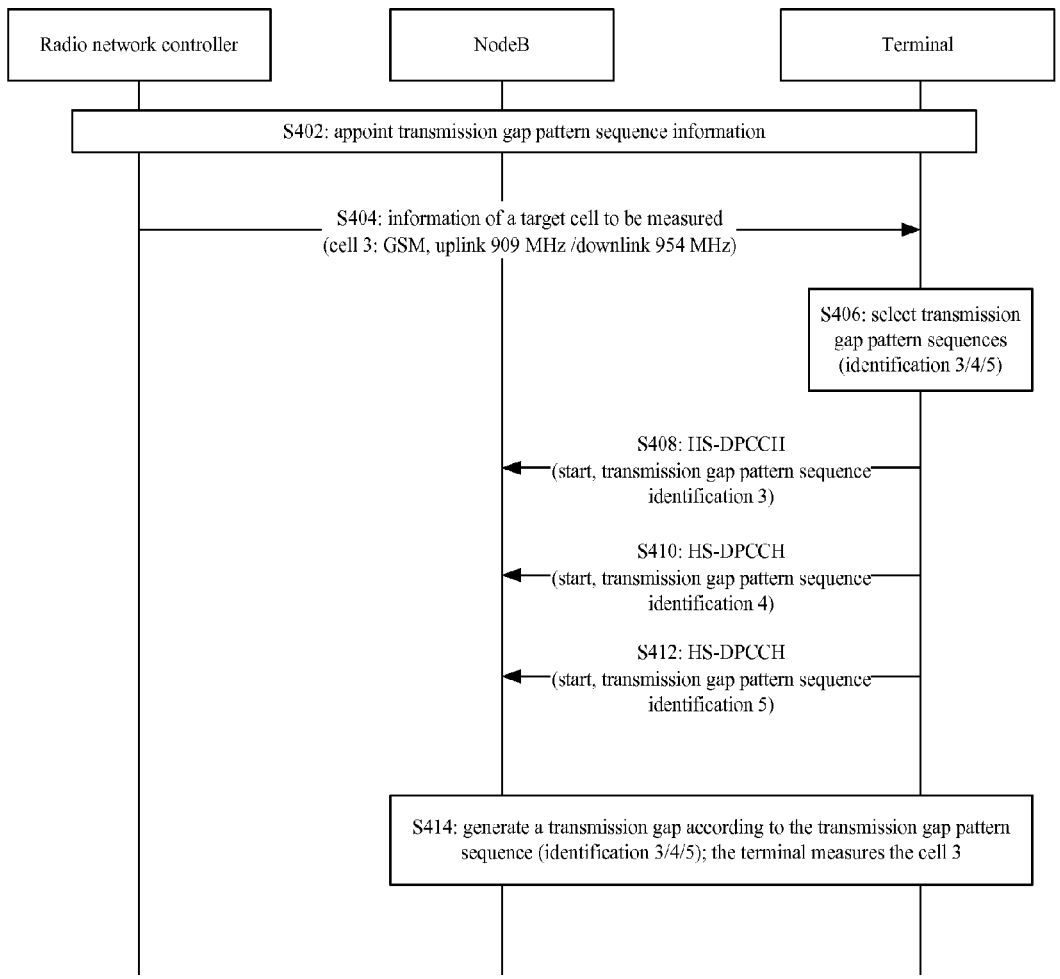
FIG. 4 shows a flowchart of a method for starting a compressed mode according to Embodiment 3 of the present invention.

The embodiment provides a method for starting a compressed mode, wherein the method is illustrated by taking the implementation in a high speed downlink packet access system for example. The implementation scene of the method is: a terminal accesses an access cell 1 of the WCDMA FDD mode and uses a service therein. Due to the service bearer feature mechanism, a radio network controller selects an inter-system adjacent cell (cell 3) of the access cell in the radio system, the cell 3 being more suitable to bear the service of the terminal. The cell 3 is a GSM mode cell, with uplink frequency of 909 MHz and downlink frequency of 954 MHz. Refer to FIG. 4, the method for starting a compressed mode comprises the steps as follows:

Step S402: the terminal, a NodeB and the radio network controller appoint the transmission gap pattern sequence information used for starting a compressed mode in advance.

In the embodiment, the transmission gap pattern sequence information used for starting a compressed mode is consistent with that in Embodiment 2, and no enumeration is needed here.

Step S404: the radio network controller notifies the information of a target cell to be measured to the terminal through an RRC protocol layer control signaling. There is only one target cell to be measured; and the target cell is identified as cell 3 and is a GSM mode cell, with uplink frequency of 909 MHz and downlink frequency of 954 MHz.

Step S406: the terminal receives the information and selects a proper transmission gap pattern sequence according to the information of the target cell to be measured. Specifically, in the embodiment, since the target cell 3 to be measured belongs to the GSM mode, the terminal selects the three sets of transmission gap pattern sequences with the transmission gap pattern sequence measurement purposes of GSM Carrier Received Signal Strength Indication measurement, GSM Initial Base Station Identity Code Identification and GSM Base Station Identity Code Identification Reconfirmation, wherein the transmission gap pattern sequence identification is 3/4/5 respectively.

Step S408: the terminal starts the transmission gap pattern sequence with the transmission gap pattern sequence identification of 3 and notifies to the NodeB.

The terminal sends the information of starting the transmission gap pattern sequence with the transmission gap pattern sequence identification of 3 to the NodeB through an HS-DPCCH.

In which, the first bit of the Confirmation domain of the HS-DPCCH is 1 and the second bit is 0, the third/fourth/fifth bit of the Confirmation domain of the HS-DPCCH takes a value of 3 to indicate the transmission gap pattern sequence identification 3; the sixth bit of the Confirmation domain of the HS-DPCCH takes a value of 1 to indicate the action of "starting" the transmission gap pattern sequence.

Step S410: the terminal starts the transmission gap pattern sequence with the transmission gap pattern sequence identification of 4 and notifies to the NodeB.

The terminal sends the information of starting the transmission gap pattern sequence with the transmission gap pattern sequence identification of 4 to the NodeB through an HS-DPCCH. In which, the first bit of the Confirmation domain of the HS-DPCCH is 1 and the second bit is 0, the third/fourth/fifth bit of the Confirmation domain of the HS-DPCCH takes a value of 4 to indicate the transmission gap pattern sequence identification 4; the sixth bit of the Confirmation domain of the HS-DPCCH takes a value of 1 to indicate the action of "starting" the transmission gap pattern sequence.

Step S412: the terminal starts the transmission gap pattern sequence with the transmission gap pattern sequence identification of 5 and notifies to the NodeB. The terminal sends the information of starting the transmission gap pattern sequence with the transmission gap pattern sequence identification of 5 to the NodeB through an HS-DPCCH. In which, the first bit of the Confirmation domain of the HS-DPCCH is 1 and the second bit is 0, the third/fourth/fifth bit of the Confirmation domain of the HS-DPCCH takes a value of 5 to indicate the transmission gap pattern sequence identification 5; the sixth bit of the Confirmation domain of the HS-DPCCH takes a value of 1 to indicate the action of "starting" the transmission gap pattern sequence.

Step S414: the terminal and the NodeB generate a transmission gap according to the description of the three sets of transmission gap pattern sequences with the transmission gap pattern sequence identifications of 3/4/5. In the transmission gap, the terminal performs a measurement to the cell 3 on a frequency with uplink frequency of 909 MHz/downlink frequency of 954 MHz.

In this embodiment, after the terminal receives the information of the target cell 3 to be measured from the radio network controller, since the target cell 3 belongs to the GSM mode, the determined transmission gap pattern sequence identification is 3/4/5 respectively, then the terminal starts the transmission gap pattern sequences corresponding to identification 3/4/5 to perform a measurement to the cell 3, thus the problem that a compressed mode can not be started in the case of load balancing mechanism or service bearer feature mechanism is solved, and the QoS of the terminal as well as the performance of the system are enhanced.

Embodiment 4

Figure 5:
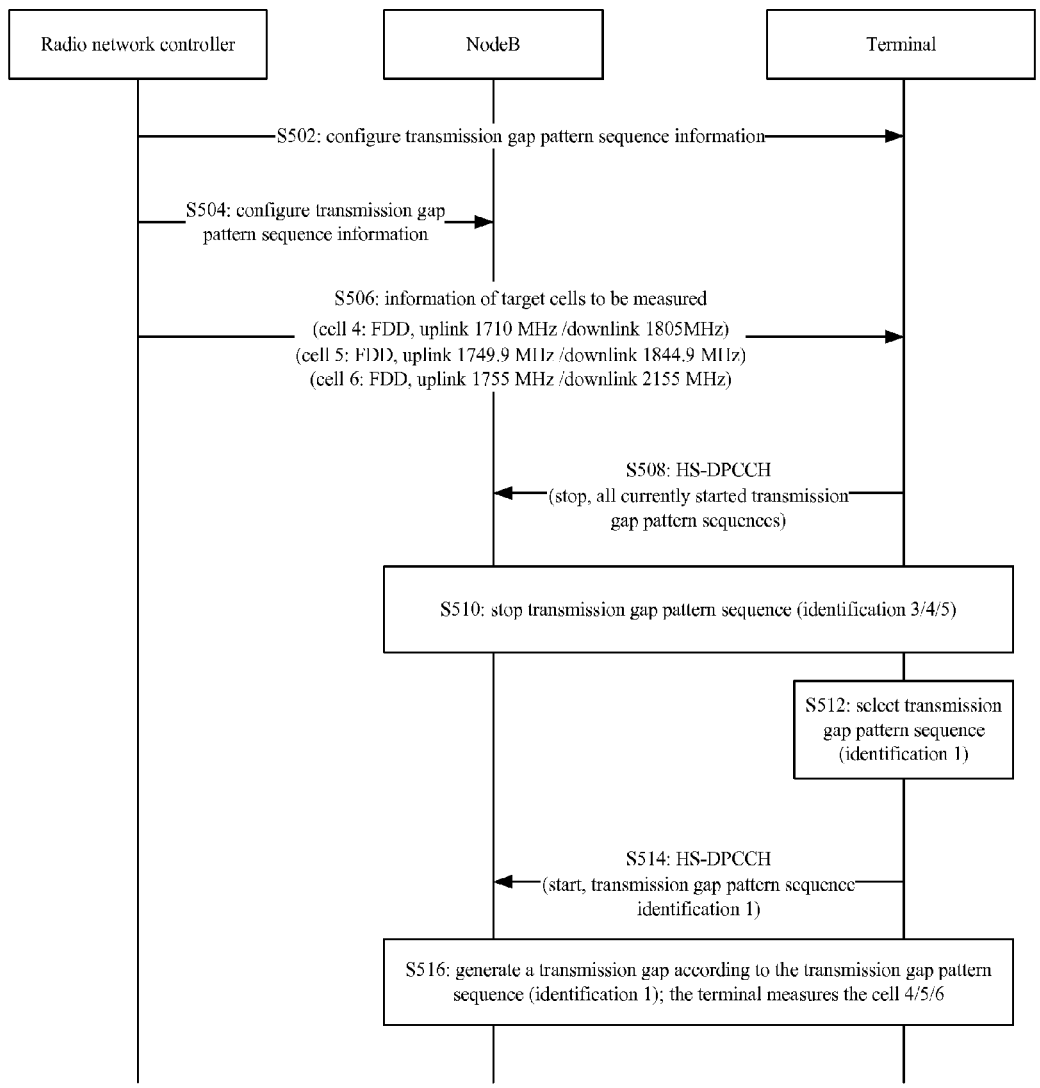
FIG. 5 shows a flowchart of a method for starting a compressed mode according to Embodiment 4 of the present invention.

The embodiment provides a method for starting a compressed mode, wherein the method is illustrated by taking the implementation in a high speed downlink packet access system for example. The implementation scene of the method is: a terminal is located in a current serving cell, i.e. cell 1 of the WCDMA FDD mode, and the cell 1 is overloaded. Based on the load balancing mechanism, a radio network controller selects inter-carrier frequency adjacent cells (cell 4/cell 5/cell 6) of the cell 1 to share the load of the cell 1, wherein the cell 4 is an FDD mode cell, with uplink frequency of 1710 MHz and downlink frequency of 1805 MHz; the cell 5 is an FDD mode cell, with uplink frequency of 1749.9 MHz and downlink frequency of 1844.9 MHz; the cell 6 is an FDD mode cell, with uplink frequency of 1755 MHz and downlink frequency of 2155 MHz. The terminal currently has already started three sets of transmission gap pattern sequences with the transmission gap pattern sequence identification of 3/4/5. Refer to FIG. 5, the method for starting a compressed mode comprises the steps as follows.

Step S502: the radio network controller configures the transmission gap pattern sequence information used for starting a compressed mode for the terminal through an RRC protocol layer control signaling.

In this embodiment, the transmission gap pattern sequence information used for starting a compressed mode is consistent with that in Embodiment 2, and no enumeration is needed here.

Step S504: the radio network controller configures the transmission gap pattern sequence information used for starting a compressed mode for the NodeB through an NBAP protocol layer control signaling, wherein the transmission gap pattern sequence information used for starting a compressed mode is consistent with that in S502, and no enumeration is needed here.

Step S506: the radio network controller notifies the information of target cells to be measured to the terminal through an RRC protocol layer control signaling. There are three target cells to be measured, specifically, one cell is identified as cell 4 and is the FDD mode cell, with uplink frequency of 1710 MHz and downlink frequency of 1805 MHz; one cell is identified as cell 5 and is the FDD mode cell, with uplink frequency of 1749.9 MHz and downlink frequency of 1844.9 MHz; and one cell is identified as cell 6 and is the FDD mode cell, with uplink frequency of 1755 MHz and downlink frequency of 2155 MHz.

Step S508: the terminal receives the information and judges that there exist three sets of started transmission gap pattern sequences with the transmission gap pattern sequence identification of 3/4/5 currently, so the terminal stops all the currently started three sets of transmission gap pattern sequences and notifies to the NodeB. The terminal sends information of stopping all currently started transmission gap pattern sequences to the NodeB through the HS-DPCCH.

In which, the first bit of the Confirmation domain of the HS-DPCCH is 1 and the second bit is 0, the third/fourth/fifth bit of the Confirmation domain of the HS-DPCCH takes a value of 0 to indicate all currently started transmission gap pattern sequences, that is, the three sets of transmission gap pattern sequences with the transmission gap pattern sequence identification of 3/4/5; the sixth bit of the Confirmation domain of the HS-DPCCH takes a value of 0 to indicate the action of "stopping" the transmission gap pattern sequences.

Step S510: the terminal and the NodeB stop the three sets of transmission gap pattern sequences with the transmission gap pattern sequence identification of 3/4/5.

Step S512: the terminal selects a proper transmission gap pattern sequence according to the information of the target cells to be measured. Specifically, cells 4/5/6 as the target cells to be measured all belong to the FDD mode, then the terminal selects the first set of transmission gap pattern sequence with the transmission gap pattern sequence measurement purpose of FDD measurement, wherein the transmission gap pattern sequence identification is 1.

Step S514: the terminal starts the transmission gap pattern sequence with the transmission gap pattern sequence identification of 1 and notifies to the NodeB. The terminal sends the information of starting the transmission gap pattern sequence with the transmission gap pattern sequence identification of 1 to the NodeB through the HS-DPCCH.

In which, the first bit of the Confirmation domain of the HS-DPCCH is 1 and the second bit is 0, the third/fourth/fifth bit of the Confirmation domain of the HS-DPCCH takes a value of 1 to indicate the transmission gap pattern sequence identification 1; the sixth bit of the Confirmation domain of the HS-DPCCH takes a value of 1 to indicate the action of "starting" the transmission gap pattern sequence.

Step S516: the terminal and the NodeB generate a transmission gap according to the description of the transmission gap pattern sequence with the transmission gap pattern sequence identification of 1. In the transmission gap, the terminal performs a measurement to the cell 4 on a frequency with uplink frequency of 1710 MHz and downlink frequency of 1805 MHz, performs a measurement to the cell 5 on a frequency with uplink frequency of 1749.9 MHz and downlink frequency of 1844.9 MHz, and performs a measurement to the cell 6 on a frequency with uplink frequency of 1755 MHz and downlink frequency of 2155 MHz.

In this embodiment, after the terminal receives the information of the cell 4/cell 5/cell 6 to be measured from the radio network controller, since the cell 4/cell 5/cell 6 all belong to the FDD mode, the determined transmission gap pattern sequence identification is 1, then the terminal starts the transmission gap pattern sequence corresponding to the identification 1 to perform measurements to the cell 4/cell 5/cell 6, thus the problem that a compressed mode can not be started in the case of load balancing mechanism or service bearer feature mechanism is solved, and the QoS of the terminal as well as the performance of the system are enhanced.

Embodiment 5

Figure 6:
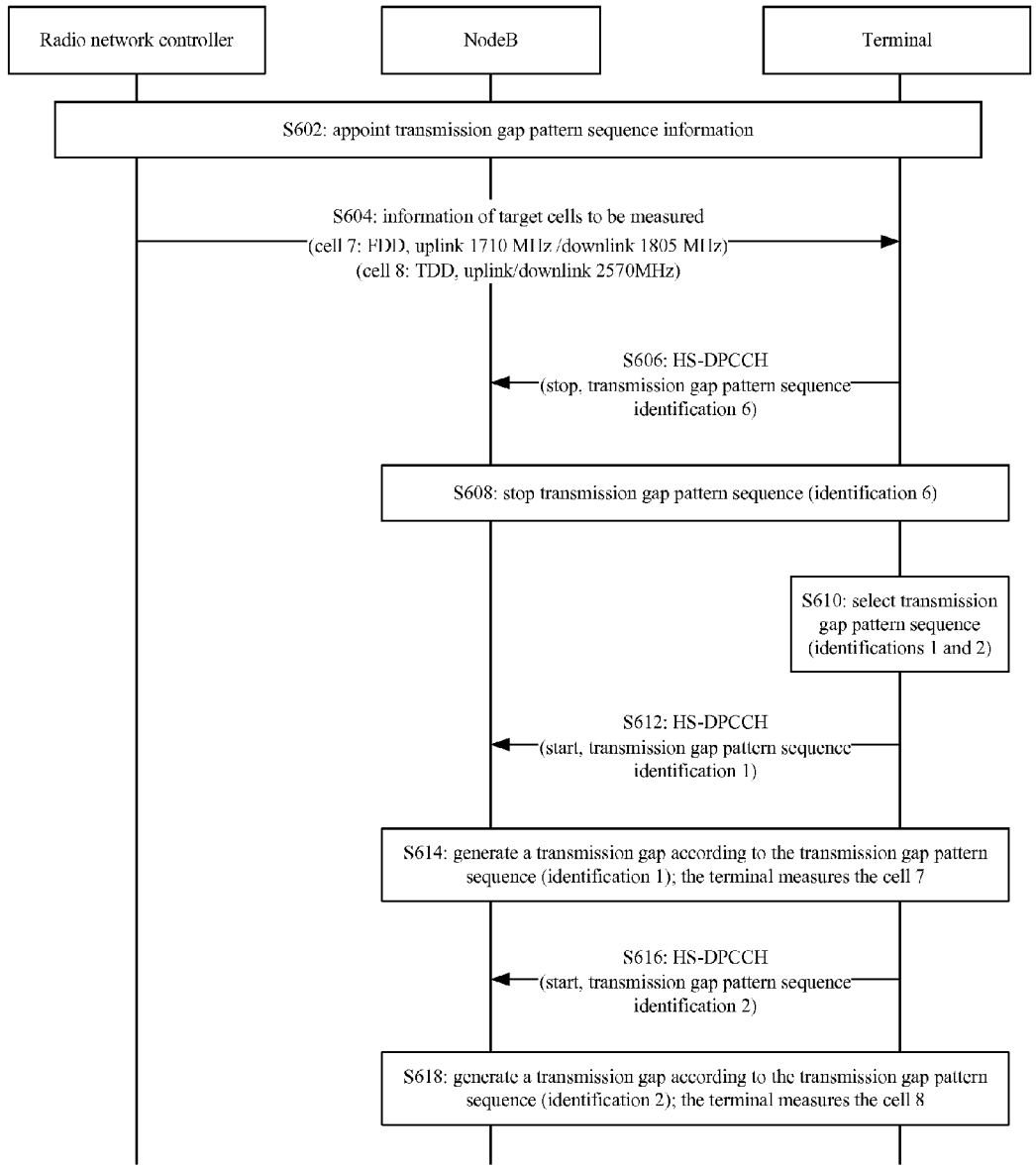
FIG. 6 shows a flowchart of a method for starting a compressed mode according to Embodiment 5 of the present invention.

The embodiment provides a method for starting a compressed mode, wherein the method is illustrated by taking the implementation in a high speed downlink packet access system for example. The implementation scene of the method is: a terminal is located in a current serving cell, i.e. cell 1 of the WCDMA FDD mode, and the cell 1 is overloaded. Based on the load balancing mechanism, a radio network controller selects inter-carrier frequency and inter-system adjacent cells (cell 7/cell 8) with a different frequency from that of the cell 1 to share the load of the cell 1, wherein the cell 7 is an FDD mode cell, with uplink frequency of 1710 MHz and downlink frequency of 1805 MHz; the cell 8 is a TDD mode cell, with uplink frequency and downlink frequency of 2570 MHz (in the TDD mode, the uplink and the downlink are on the same frequency). The terminal currently has started the set of transmission gap pattern sequence with the transmission gap pattern sequence identification of 6. Refer to FIG. 6, the method for starting a compressed mode comprises the steps as follows.

Step S602: the terminal, a NodeB and the radio network controller appoint the transmission gap pattern sequence information used for starting a compressed mode in advance.

In the embodiment, the transmission gap pattern sequence information used for starting a compressed mode is consistent with that in Embodiment 2, and no enumeration is needed here.

Step S604: the radio network controller notifies the information of target cells to be measured to the terminal through an RRC protocol layer control signaling. There are two target cells to be measured, specifically, one cell is identified as cell 7 and is the FDD mode cell, with uplink frequency of 1710 MHz and downlink frequency of 1805 MHz; the other cell is identified as cell 8 and is the TDD mode cell, with uplink frequency and downlink frequency of 2570 MHz.

Step S606: the terminal receives the information and judges that there exists a set of started transmission gap pattern sequence with the transmission gap pattern sequence identification of 6 currently, so the terminal stops all the currently started set of transmission gap pattern sequence with the transmission gap pattern sequence identification of 6 and notifies to the NodeB. The terminal sends information of stopping the set of transmission gap pattern sequence with the transmission gap pattern sequence identification of 6 to the NodeB through an HS-DPCCH.

In which, the first bit of the Confirmation domain of the HS-DPCCH is 1 and the second bit is 0, the third/fourth/fifth bit of the Confirmation domain of the HS-DPCCH takes a value of 6 to indicate the transmission gap pattern sequence 6; the sixth bit of the Confirmation domain of the HS-DPCCH takes a value of 0 to indicate the action of "stopping" the transmission gap pattern sequence.

Step S608: the terminal and the NodeB stop the set of transmission gap pattern sequence with the transmission gap pattern sequence identification of 6.

Step S610: the terminal selects proper transmission gap pattern sequences according to the information of the target cells to be measured.

The step specifically comprises the following: the cell 7 in the target cells to be measured belongs to the FDD mode, then the terminal selects the first set of transmission gap pattern sequence with the transmission gap pattern sequence measurement purpose of FDD measurement, wherein the transmission gap pattern sequence identification is 1; the cell 8 in the target cells to be measured belongs to the TDD mode, then the terminal selects the second set of transmission gap pattern sequence with the transmission gap pattern sequence measurement purpose of TDD measurement, wherein the transmission gap pattern sequence identification is 2.

Step S612: the terminal starts the transmission gap pattern sequence with the transmission gap pattern sequence identification of 1 and notifies to the NodeB. The terminal sends the information of starting the transmission gap pattern sequence with the transmission gap pattern sequence identification of 1 to the NodeB through an HS-DPCCH.

In which, the first bit of the Confirmation domain of the HS-DPCCH is 1 and the second bit is 0, the third/fourth/fifth bit of the Confirmation domain of the HS-DPCCH takes a value of 1 to indicate the transmission gap pattern sequence identification 1; the sixth bit of the Confirmation domain of the HS-DPCCH takes a value of 1 to indicate the action of "starting" the transmission gap pattern sequence.

Step S614: the terminal and the NodeB generate a transmission gap according to the description of the transmission gap pattern sequence with the transmission gap pattern sequence identification of 1. In the transmission gap generated by the transmission gap pattern sequence with the identification of 1, the terminal performs a measurement to the cell 7 on a frequency with uplink frequency of 1710 MHz and downlink frequency of 1805 MHz.

Step S616: the terminal starts the transmission gap pattern sequence with the transmission gap pattern sequence identification of 2 and notifies to the NodeB. The terminal sends the information of starting the transmission gap pattern sequence with the transmission gap pattern sequence identification of 2 to the NodeB through an HS-DPCCH.

In which, the first bit of the Confirmation domain of the HS-DPCCH is 1 and the second bit is 0, the third/fourth/fifth bit of the Confirmation domain of the HS-DPCCH takes a value of 2 to indicate the transmission gap pattern sequence identification 2; the sixth bit of the Confirmation domain of the HS-DPCCH takes a value of 1 to indicate the action of "starting" the transmission gap pattern sequence.

Step S618: the terminal and the NodeB generate a transmission gap according to the description of the transmission gap pattern sequence with the transmission gap pattern sequence identification of 2. In the transmission gap generated by the transmission gap pattern sequence with the identification of 2, the terminal performs a measurement to the cell 8 on a frequency with uplink frequency and downlink frequency of 2570 MHz.

In this embodiment, after the terminal receives the information of the cell 7/cell 8 to be measured from the radio network controller, since the cell 7 belongs to the FDD mode, the terminal starts the transmission gap pattern sequence with the identification of 1 to perform a measurement to the cell 7; and since the cell 8 belongs to the TDD mode, the terminal starts the transmission gap pattern sequence with the identification of 2 to perform a measurement to the cell 8; thus the problem that a compressed mode can not be started in the case of load balancing mechanism or service bearer feature mechanism is solved, and the QoS of the terminal as well as the performance of the system are enhanced.

Embodiment 6

Figure 7:
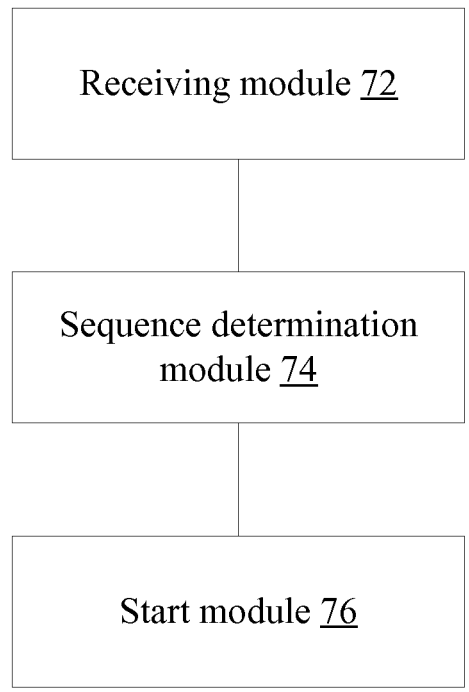
FIG. 7 shows a structure diagram of a terminal according to Embodiment 6 of the present invention.

The embodiment provides a terminal. Refer to FIG. 7, the terminal comprises modules as follows.

A receiving module 72 is configured to receive information of a target cell to be measured from a radio network controller.

In this embodiment, the target cell to be measured provided by the radio network controller may be one or more cells. For example, the target cell can be: in a load balancing mechanism, an inter-carrier frequency and/or inter-system adjacent cell of a current serving cell selected by the radio network controller for sharing load; the target cell also can be: in a service bearer feature mechanism, an inter-carrier frequency and/or inter-system adjacent cell of an access cell selected by the radio network controller for bearing the service of the terminal.

A sequence determination module 74, connected to the receiving module 72, is configured to determine a transmission gap pattern sequence according to the information of a target cell to be measured.

A start module 76, connected to the sequence determination module 74, is configured to start, according to the determined transmission gap pattern sequence, a compressed mode to perform a measurement to the target cell.

Figure 8:
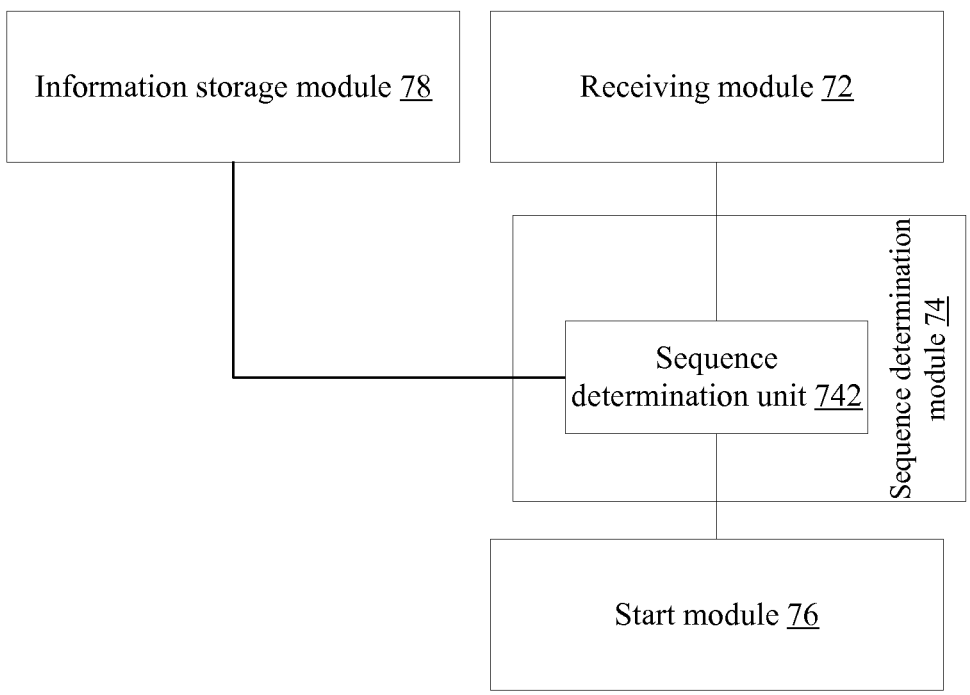
FIG. 8 shows a specific structure diagram of a terminal according to Embodiment 6 of the present invention.

Refer to FIG. 8, a specific structure diagram of the terminal provided by the embodiment is shown, wherein the terminal further comprises: an information storage module 78, connected to the sequence determination module 74, configured to store transmission gap pattern sequence information, wherein the transmission gap pattern sequence information comprises: measurement purpose information, transmission gap pattern sequence identification information corresponding to the measurement purpose, and transmission gap information corresponding to the measurement purpose. For example, the transmission gap pattern sequence information specifically comprises: one set or multiple sets of transmission gap pattern sequences. Each set of transmission gap pattern sequence at least comprises: transmission gap pattern sequence identification information, transmission gap pattern sequence measurement purpose information, transmission gap pattern 1 and/or transmission gap pattern 2 information, and the information of the transmission gap provided by each type of transmission gap pattern in one transmission gap pattern length.

Correspondingly, the sequence determination module 74 comprises: a sequence determination unit 742, configured to determine the transmission gap pattern sequence according to the information of the target cell to be measured and the transmission gap pattern sequence information.

The transmission gap pattern sequence information stored by the information storage module 78 of the terminal can be obtained by one of the following ways: 1) the terminal, a NodeB and the radio network controller appoint the transmission gap pattern sequence information in advance; 2) the radio network controller configures the transmission gap pattern sequence information for the terminal and the NodeB. For example, when the system applies the second way, the radio network controller can configure the transmission gap pattern sequence information used for starting a compressed mode for the terminal through an RRC protocol layer control signaling; meanwhile, the radio network controller configures the transmission gap pattern sequence information used for starting a compressed mode for the NodeB through an NBAP protocol layer control signaling. After the terminal obtains the transmission gap pattern sequence information, the information storage module stores the information.

Preferably, the information of the target cell to be measured received by the receiving module 72 comprises: a cell identification, a type indication of a mode adopted by a cell and a cell frequency, wherein the mode adopted by the cell comprises: an FDD mode, a TDD mode, a GSM mode or an E-UTRA mode; the sequence determination unit 742 comprises:
  a first sequence determination unit, configured to select the transmission gap pattern sequence with measurement purpose of FDD measurement when the target cell adopts the FDD mode;
  a second sequence determination unit, configured to select the transmission gap pattern sequence with measurement purpose of TDD measurement when the target cell adopts the TDD mode;
  a third sequence determination unit, configured to select, when the target cell adopts the GSM mode, the transmission gap pattern sequences corresponding to the following three measurement purposes: GSM Carrier Received Signal Strength Indication measurement, GSM Initial Base Station Identity Code Identification and GSM Base Station Identity Code Identification Reconfirmation;
  a fourth sequence determination unit, configured to select the transmission gap pattern sequence with measurement purpose of E-UTRA measurement when the target cell adopts the E-UTRA mode.

Preferably, the start module 76 comprises: a notification unit, configured to notify the determined transmission gap pattern sequence to a NodeB; a start unit, configured to generate a transmission gap used for measuring the target cell according to the transmission gap pattern sequence. In the transmission gap, the terminal performs a measurement to the target cell on the frequency of the target cell to be measured.

In the embodiment of the present invention, the transmission gap pattern sequence identification mentioned above is encoded by 3 bits, with a value range of 0 to 7. The transmission gap pattern sequence identification with the value of 0 is appointed to be reserved, indicating all currently started transmission gap pattern sequences and being used only when the terminal stops the transmission gap pattern sequence. The rest 7 values from 1 to 7 are used for the transmission gap pattern sequence identification, and each set of transmission gap pattern sequence is uniquely identified by one transmission gap pattern sequence identification. The action of "starting" or "stopping" the transmission gap pattern sequence is encoded by one bit to indicate; when the bit takes a value of 1, it is indicated to "start", when the bit takes a value of 0, it is indicated to "stop".

The embodiment of the present invention notifies the determined transmission gap pattern sequence to the NodeB by adopting an HS-DPCCH, wherein the HS-DPCCH is an uplink direction control channel, which is used to bear the feedback information of downlink data reception Acknowledgement/Non-Acknowledgement for the downlink data reception conditions, and to bear the quality feedback information of the downlink data reception quality. In the HS-DPCCH, a domain for bearing the Acknowledgement/Non-Acknowledgement information for the downlink data reception conditions is called a Confirmation domain.

The Confirmation domain mentioned above consists of 10 bits. The present embodiment uses the unused encoded part in the 10-bit Confirmation domain in the HS-DPCCH. When the first bit of the Confirmation domain is 1 and the second bit is 0, the rest 8 bits with code valued from all 0 to all 1 are not utilized by relevant technology. In each of the following embodiments involved in the HS-DPCCH, when the first bit of the Confirmation domain is 1 and the second bit is 0, the third/fourth/fifth bit of the Confirmation domain is used to indicate the transmission gap pattern sequence identification, wherein the transmission gap pattern sequence identification with the value of 0 is appointed to be reserved, indicating all currently started transmission gap pattern sequences and being used only when the terminal or the NodeB stops the transmission gap pattern sequence. The rest 7 values from 1 to 7 are used for the transmission gap pattern sequence identification, and each set of transmission gap pattern sequence is uniquely identified by one transmission gap pattern sequence identification. The sixth bit of the Confirmation domain is used to indicate the action of "starting" or "stopping" the transmission gap pattern sequence. For example, when the bit takes a value of 1, it is indicated to "start", when the bit takes a value of 0, it is indicated to "stop".

When starting a new transmission gap pattern sequence, the terminal can stop the currently started transmission gap pattern sequence and notifies the NodeB to stop the currently started transmission gap pattern sequence. After the terminal completes the policy for the target cell every time, the started transmission gap pattern sequence can stop automatically; or, after the terminal completes the cell switching, the started transmission gap pattern sequence can stop automatically.

In the embodiment, the terminal receives information of a target cell to be measured from a radio network controller, determines a proper transmission gap pattern sequence according to the information of the target cell to be measured and then starts a compressed mode, thereby solving the problem that a compressed mode can not be started in the case of load balancing mechanism or service bearer feature mechanism, and enhancing the QoS of the terminal as well as the performance of the system.

Embodiment 7

Figure 9:
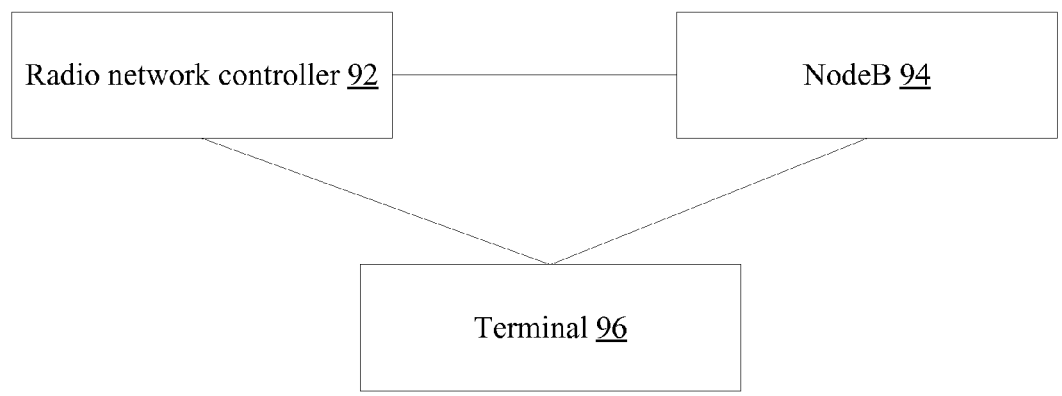
FIG. 9 shows a structure diagram of a communication system according to embodiment 7 of the present invention.

The embodiment provides a communication system. Refer to FIG. 9, the communication system comprises: a radio network controller 92, a NodeB 94 and a terminal 96, in which, the radio network controller 92, the NodeB 94 and the terminal 96 are in wireless connection. The radio network controller 92 in the embodiment is configured to send information of a target cell to be measured to the terminal 96.

The function of the terminal 96 in this embodiment is the same as the function of the terminal in Embodiment 6; the terminal 96 also comprises: a receiving module, a sequence determination and a start module, and the specific function are not described again here.

The radio network controller 92, the NodeB 94 and the terminal 96 in the embodiment are further configured to appoint the transmission gap pattern sequence information in advance; or, the radio network controller 92 is further configured to configure the transmission gap pattern sequence information for the terminal 96 and the NodeB 94 in advance. In which, the specific information of the transmission gap pattern sequence information can be the same as that in Embodiment 2 or Embodiment 6, and no further description is needed here.

In the embodiment, the terminal receives information of a target cell to be measured from a radio network controller, determines a proper transmission gap pattern sequence according to the information of the target cell to be measured and then starts a compressed mode, thereby solving the problem that a compressed mode can not be started in the case of load balancing mechanism or service bearer feature mechanism, and enhancing the QoS of the terminal as well as the performance of the system.

From the description above, it can be concluded that the present invention achieves the following effect: by receiving information of a target cell to be measured from a radio network controller, determining a proper transmission gap pattern sequence according to the information of the target cell to be measured and then starting a compressed mode, the terminal in the embodiment solves the problem that a compressed mode can not be started in the case of load balancing mechanism or service bearer feature mechanism, enhances the QoS of the terminal as well as the performance of the system.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

The invention claimed is:

1. A method for starting a compressed mode, comprising:
   a terminal receiving information of a target cell to be measured from a radio network controller;
   the terminal determining a transmission gap pattern sequence according to the information of the target cell to be measured; and
   the terminal starting, according to the determined transmission gap pattern sequence, a compressed mode to perform a measurement to the target cell,
   wherein before receiving information of the target cell to be measured from the radio network controller, the method further comprises: the terminal storing transmission gap pattern sequence information, wherein the transmission gap pattern sequence information comprises: measurement purpose information, transmission gap pattern sequence identification information corresponding to the measurement purpose, and transmission gap information corresponding to the measurement purpose; and
   wherein the terminal determining the transmission gap pattern sequence according to the information of the target cell to be measured comprises: the terminal determining the transmission gap pattern sequence according to the information of the target cell to be measured and the transmission gap pattern sequence information.

2. The method according to claim 1, wherein the terminal stores the transmission gap pattern sequence information by one of the following ways:
   the terminal, a NodeB and the radio network controller appointing the transmission gap pattern sequence information in advance, and the terminal storing the appointed transmission gap pattern sequence information;
   the radio network controller configuring the transmission gap pattern sequence information for the terminal and a NodeB, and the terminal storing the configured transmission gap pattern sequence information.

3. The method according to claim 1, wherein the information of the target cell to be measured comprises: a cell identification, a type indication of a mode adopted by a cell and a cell frequency, wherein the mode adopted by the cell comprises: a Frequency Division Duplex (FDD) mode, a Time Division Duplex (TDD) mode, a Global system for Mobile Communication (GSM) mode or an Enhanced Universal Terrestrial Radio Access (E-UTRA) mode;
   the step of the terminal determining the transmission gap pattern sequence comprises:
   when the target cell adopts the FDD mode, the terminal selecting the transmission gap pattern sequence with measurement purpose of FDD measurement;
   when the target cell adopts the TDD mode, the terminal selecting the transmission gap pattern sequence with measurement purpose of TDD measurement;
   when the target cell adopts the GSM mode, the terminal selecting the transmission gap pattern sequences corresponding to the following three measurement purposes: GSM Carrier Received Signal Strength Indication measurement, GSM Initial Base Station Identity Code Identification and GSM Base Station Identity Code Identification Reconfirmation;
   when the target cell adopts the E-UTRA mode, the terminal selecting the transmission gap pattern sequence with measurement purpose of E-UTRA measurement.

4. The method according to claim 1, wherein the target cell to be measured comprises at least one of the following:

in a load balancing mechanism, an inter-carrier frequency and/or inter-system adjacent cell, selected by the radio network controller for sharing load, of a current serving cell;

in a service bearer feature mechanism, an inter-carrier frequency and/or inter-system adjacent cell, selected by the radio network controller for bearing a service of the terminal, of an access cell.

5. The method according to claim 1, wherein the step of the terminal starting the compressed mode according to the determined transmission gap pattern sequence comprises:

the terminal notifying the determined transmission gap pattern sequence to a NodeB; and the terminal and the NodeB generating, according to the transmission gap pattern sequence, a transmission gap used for measuring the target cell.

6. The method according to claim 5, wherein before the step of the terminal receiving the information of the target cell to be measured from the radio network controller, the method further comprises: the radio network controller sending the information of the target cell to be measured to the terminal through a Radio Resource Control (RRC) protocol layer control signaling; and the step of the terminal notifying the determined transmission gap pattern sequence to the NodeB comprises: the terminal notifying the determined transmission gap pattern sequence to the NodeB through a High Speed Dedicated Physical Control Channel (HS-DPCCH).

7. The method according to claim 1, wherein after the step of the terminal receiving the information of the target cell to be measured from the radio network controller, the method further comprises:

the terminal stopping a currently started transmission gap pattern sequence and notifying a NodeB to stop the currently started transmission gap pattern sequence.

8. A terminal comprising a hardware processor configured to execute program units stored on a memory, the program units comprising:

a receiving module, configured to receive information of a target cell to be measured from a radio network controller;

a sequence determination module, configured to determine a transmission gap pattern sequence according to the information of the target cell to be measured;

a start module, configured to start a compressed mode according to the determined transmission gap pattern sequence to perform a measurement to the target cell, wherein the program units further comprise: an information storage module, configured to store transmission gap pattern sequence information, wherein the transmission gap pattern sequence information comprises: measurement purpose information, transmission gap pattern sequence identification information corresponding to the measurement purpose, and transmission gap information corresponding to the measurement purpose; and wherein the sequence determination module comprises: a sequence determination unit, configured to determine the transmission gap pattern sequence according to the information of the target cell to be measured and the transmission gap pattern sequence information.

9. The terminal according to claim 8, wherein the information of the target cell to be measured received by the receiving module comprises: a cell identification, a type indication of a mode adopted by a cell and a cell frequency, wherein the mode adopted by the cell comprises: an FDD mode, a TDD mode, a GSM mode or an E-UTRA mode;

the sequence determination unit comprises:

a first sequence determination unit, configured to select the transmission gap pattern sequence with measurement purpose of FDD measurement when the target cell adopts the FDD mode;

a second sequence determination unit, configured to select the transmission gap pattern sequence with measurement purpose of TDD measurement when the target cell adopts the TDD mode;

a third sequence determination unit, configured to select, when the target cell adopts the GSM mode, the transmission gap pattern sequences corresponding to the following three measurement purposes: GSM Carrier Received Signal Strength Indication measurement, GSM Initial Base Station Identity Code Identification and GSM Base Station Identity Code Identification Reconfirmation;

a fourth sequence determination unit, configured to select the transmission gap pattern sequence with measurement purpose of E-UTRA measurement when the target cell adopts the E-UTRA mode.

10. The terminal according to claim 8, wherein the start module comprises:

a notification unit, configured to notify the determined transmission gap pattern sequence to a NodeB;

a start unit, configured to generate, according to the transmission gap pattern sequence, a transmission gap used for measuring the target cell.

11. A communication system, comprising a radio network controller, a NodeB and a terminal, wherein the radio network controller is configured to send information of a target cell to be measured to the terminal;

the terminal comprising a hardware processor configured to execute program units stored on a memory, the program units comprising:

a receiving module, configured to receive the information of the target cell to be measured from the radio network controller;

a sequence determination module, configured to determine a transmission gap pattern sequence according to the information of the target cell to be measured;

a start module, configured to start a compressed mode according to the determined transmission gap pattern sequence to perform a measurement to the target cell, wherein the program units further comprise: an information storage module, configured to store transmission gap pattern sequence information, wherein the transmission gap pattern sequence information comprises: measurement purpose information, transmission gap pattern sequence identification information corresponding to the measurement purpose, and transmission gap information corresponding to the measurement purpose; and wherein the sequence determination module comprises: a sequence determination unit, configured to determine the transmission gap pattern sequence according to the information of the target cell to be measured and the transmission gap pattern sequence information.

12. The communication system according to claim 11, wherein the terminal, the NodeB and the radio network controller are further configured to appoint the transmission gap pattern sequence information in advance, and the information storage module is configured to store the appointed transmission gap pattern sequence information;

or, the radio network controller is further configured to configure the transmission gap pattern sequence information for the terminal and the NodeB in advance, and the information storage module is configured to store the configured transmission gap pattern sequence information.

13. The method according to claim 1, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

14. The method according to claim 2, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

15. The method according to claim 3, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

16. The method according to claim 4, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

17. The method according to claim 5, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

18. The method according to claim 6, wherein after the step of the terminal receiving the information of the target cell to be measured from the radio network controller, the method further comprises:
the terminal stopping a currently started transmission gap pattern sequence and notifying a NodeB to stop the currently started transmission gap pattern sequence.

* * * * *